Figure 6:
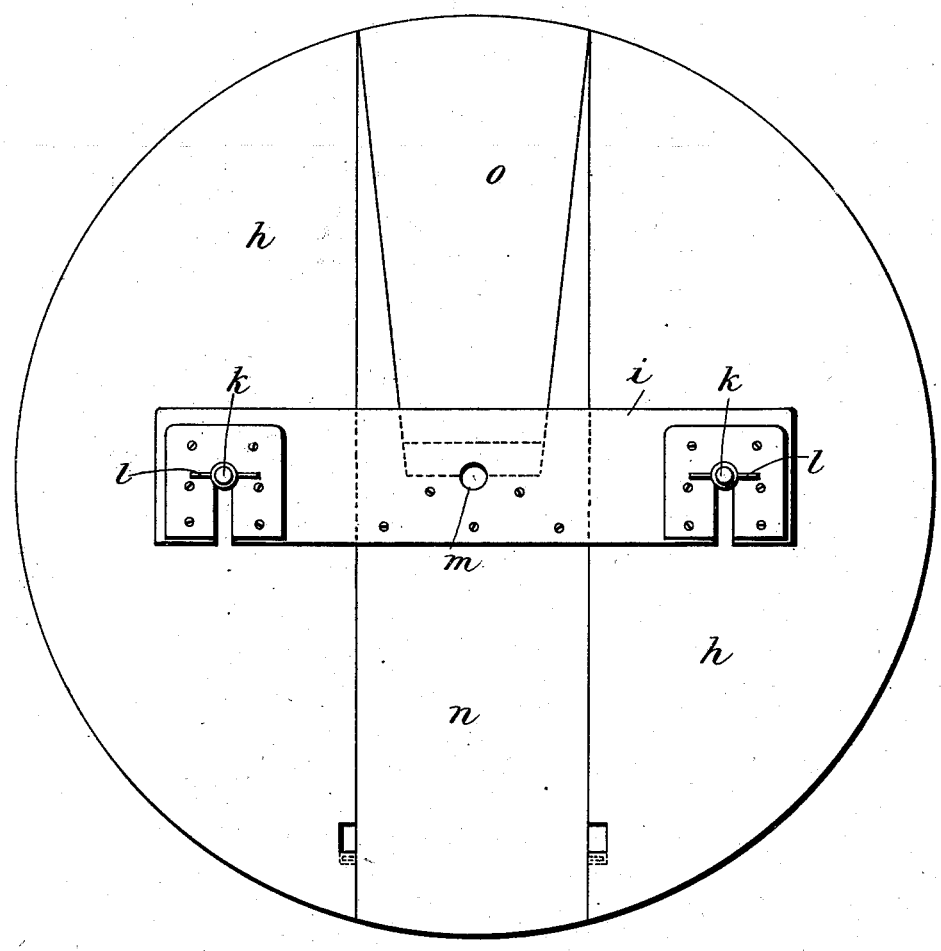

No. 651,743. Patented June 12, 1900.
T. & W. CALDWELL.
DETACHABLE COVER FOR PNEUMATIC TIRES.
(Application filed July 18, 1898.)
(No Model.) 4 Sheets—Sheet 1.
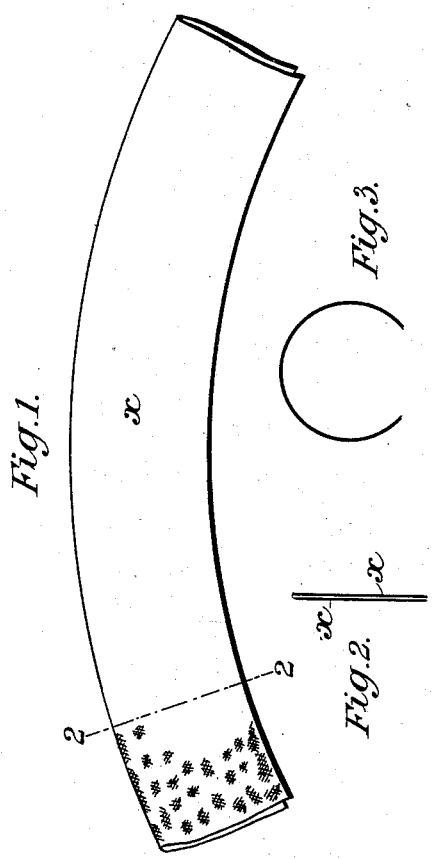
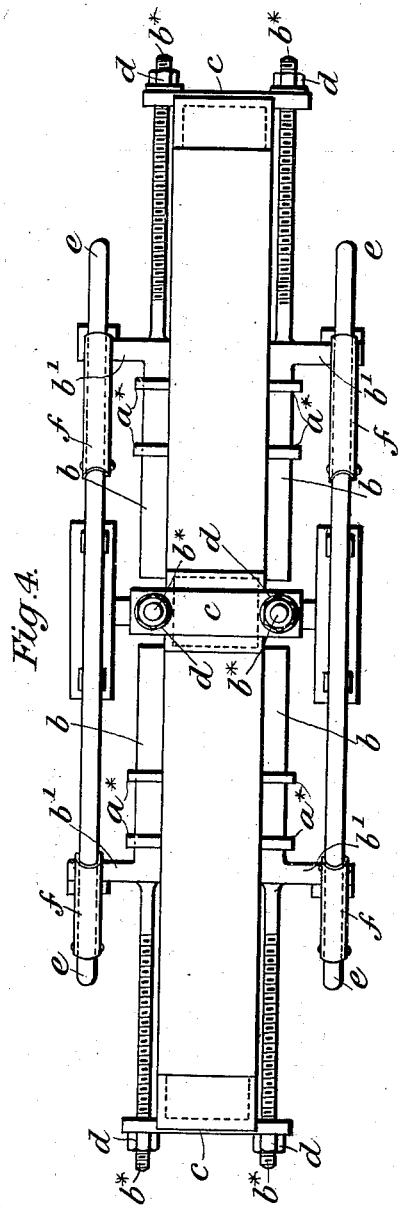
Witnesses
Inventors
T. Caldwell
W. Caldwell
By Wilkinson & Fisher
Attorneys

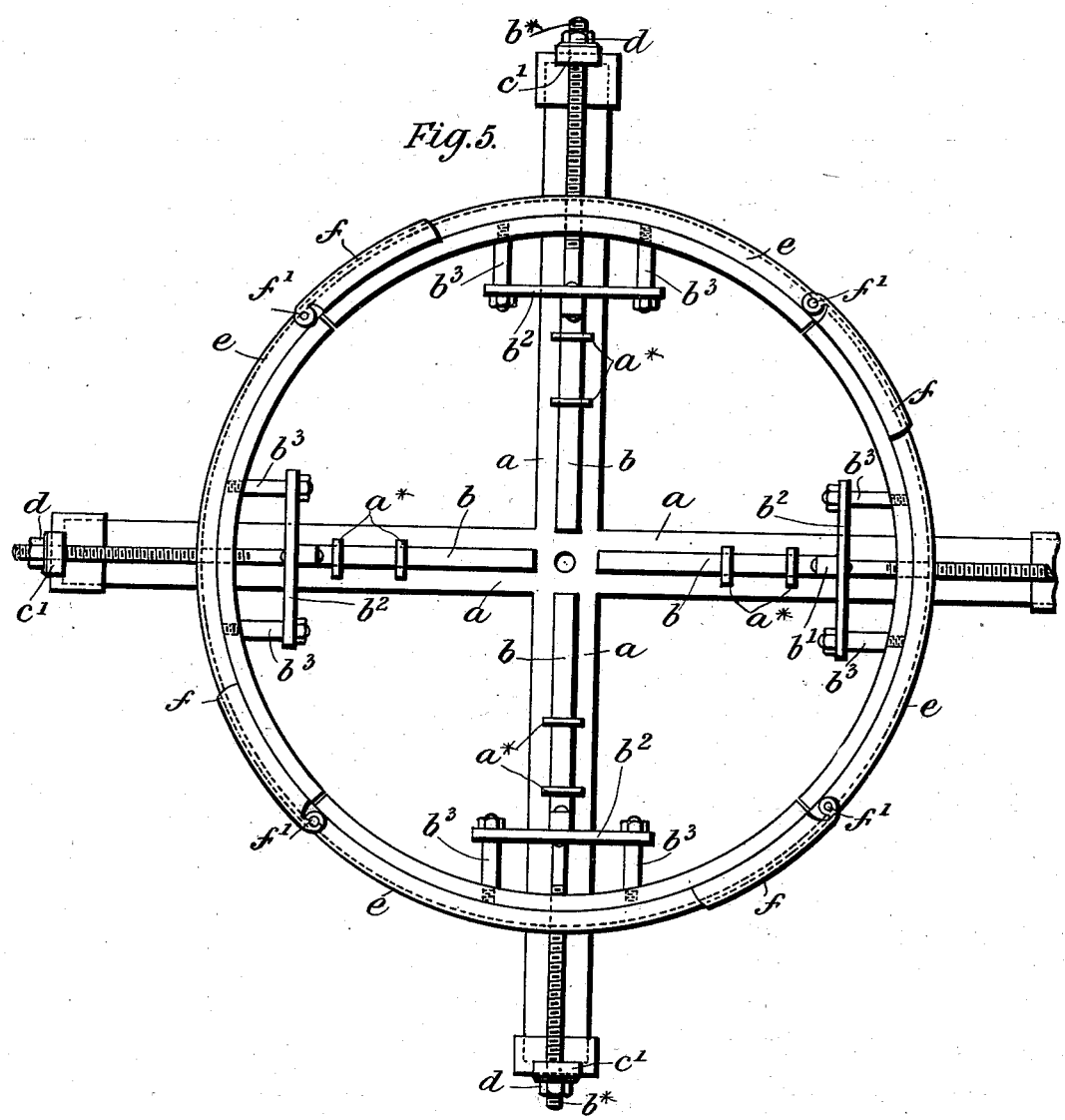

No. 651,743. Patented June 12, 1900.
T. & W. CALDWELL.
DETACHABLE COVER FOR PNEUMATIC TIRES.
(Application filed July 18, 1898.)
(No Model.) 4 Sheets—Sheet 3.

Witnesses
John Chalmers Wilson
C. A. Bateman

Inventors
T. Caldwell
W. Caldwell
by Wilkinson & Fisher
Attorneys

No. 651,743. Patented June 12, 1900.
T. & W. CALDWELL.
DETACHABLE COVER FOR PNEUMATIC TIRES.
(Application filed July 18, 1898.)
(No Model.) 4 Sheets—Sheet 4.
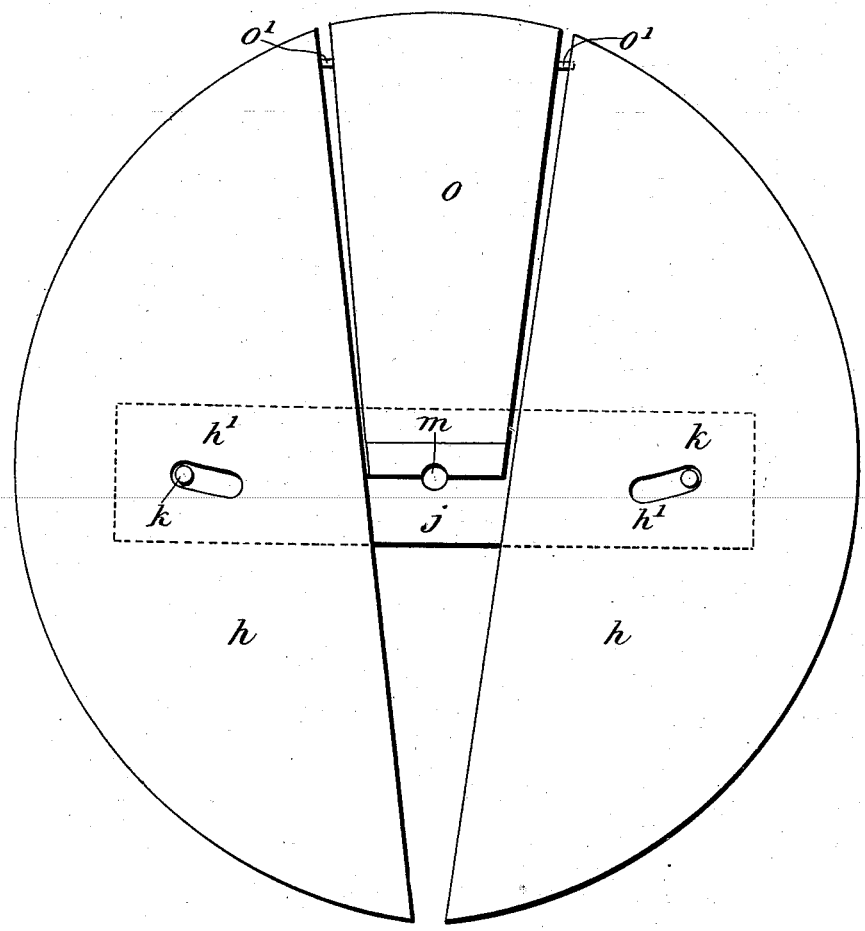
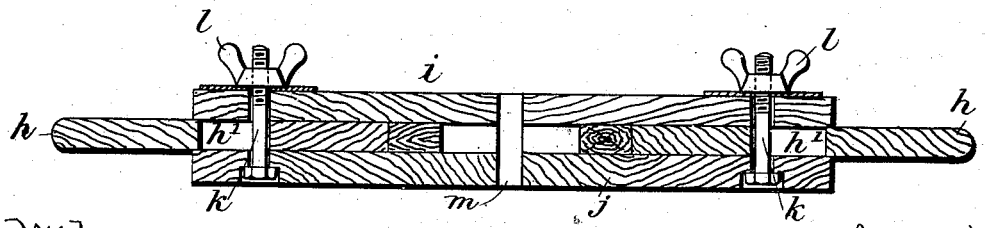
Witnesses
John Chalmers Wilson
C. A. Bateman
Inventors
T. Caldwell
W. Caldwell
by Wilkinson & Fisher
Attorneys

UNITED STATES PATENT OFFICE.

THOMAS CALDWELL, OF BOLTON, AND WILLIAM CALDWELL, OF LEIGH, ENGLAND, ASSIGNORS, BY MESNE ASSIGNMENTS, TO THE RADAX PNEUMATIC TYRE COMPANY, LIMITED, OF WARRINGTON, ENGLAND.

DETACHABLE COVER FOR PNEUMATIC TIRES.

SPECIFICATION forming part of Letters Patent No. 651,743, dated June 12, 1900.

Application filed July 18, 1898. Serial No. 686,298. (No model.)

*To all whom it may concern:*

Be it known that we, THOMAS CALDWELL, cycle agent, residing at 137 Blackburn road, Bolton, and WILLIAM CALDWELL, cotton-mill manager, residing at Vicarage Square, Leigh, in the county of Lancaster, England, subjects of the Queen of Great Britain, have invented an Improved Detachable Cover for Pneumatic Tires, of which the following is a specification.

This invention has for its object improvements in or relating to detachable covers for pneumatic tires and is designed to produce a cover which when the tire is inflated will firmly hold onto and remain on a wheel-rim of any suitable concavity without any side wires or thickened edges or parts to lock or connectedly engage into the rim—in fact, without adding any holding-on devices at all.

Our present invention is as follows: First of all we employ a textile fabric (advantageously a woven cotton cloth or canvas of sufficient strength and resilience) formed in any suitable manner and by any suitable means somewhat V-shaped or U-shaped in cross-section and also curved (as to its length) of or about the radius of the tire to be made, such shaped fabric being woven or produced in any suitable manner—for instance, by weaving in the manner and by the means set forth in the specification of another application for Letters Patent which we are filing concurrently herewith—and this specially-formed fabric we now proceed to stretch, advantageously in a circular direction, as hereinafter described, or otherwise treat same so as to take all "stretch" out of the fabric or to take so much of the stretch out as to answer our purpose, although we consider that the more stretch taken out of the fabric—*i. e.*, the more we render the fabric incapable of or difficult of further stretching—the better, and this severe stretching operation or other method of taking out the stretch should be effected before rubbering such fabric or finally forming the tire-cover.

In order that our invention may be easily understood and readily carried into practice, we will proceed to fully describe same with reference to the drawings hereunto annexed, in which—

Figure 7:
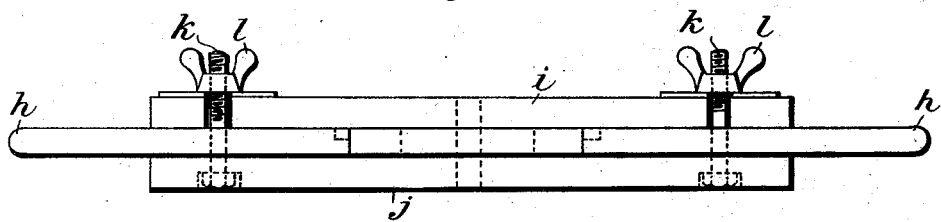

Figure 1 shows a short length of the self-shaped fabric, Fig. 2 being a cross-sectional view thereof on line 2 2, Fig. 1, and Fig 3 a similar view showing the shape in cross-section which said fabric assumes when in use. Fig. 4 is a side view, and Fig. 5 an edge view, of an expanding-mandrel or apparatus suitable for stretching the aforesaid fabric $x$ in a circular direction, such apparatus consisting of a strong radial frame $a$, each said radial arm $a$ having guided therein or thereon the sliding guide-rods $b$, the upper ends $b^\times$ whereof are screw-threaded and pass freely through eyes in the overhanging ends $c'$ of a plate $c$, fixed on the outer end of each arm $a$, and by screwing a nut $d$ (winged or otherwise) on each said screw $b^\times$, as shown, thereby the said guide-rods $b$ can be moved radially and slide through the eyelets $a^\times$ on the frame $a$, by which latter and the ends $c'$ of the plate $c$ said rods $b$ are guided. From each said rod $b$ an arm $b'$ extends laterally and carries cross-arms $b^2$, which latter are connected at $b^3$ rigidly to the quadrant $e$, four quadrants being thus mounted on each side of the frame $a$ to thus form two separate and independent expanding-mandrels, each quadrant-piece $e$ having hinged thereto at $f'$ a metal flap $f$, which latter serves to bridge over the gaps formed between the ends of the quadrants $e$ as the latter are drawn apart when the mandrel is expanded. Figs. 6 to 9 show another mandrel or apparatus—viz., a collapsible mandrel—upon which the cover is finally built up and finished, and the mandrel can then be collapsed in order to enable the now-finished cover to be removed from said mandrel, Fig. 6 showing the mandrel rigid and of fixed diameter ready for the fabric to be lapped around same. Fig. 7 is an edge view thereof. Fig. 8 is a cross-sectional view on line 8 8, Fig. 6. Fig. 9 is a similar view to Fig. 6, showing the mandrel collapsed.

$h\ h$ are two similar segments of a circle the circumferential edges whereof are of a convexity or shape in cross-section corresponding to the shape it is desired the cover should assume and of a radius equal to the radius of the cover to be made thereon.

$i$ and $j$ are stretcher-boards arranged on opposite sides of the segmental pieces $h$ and provided with clamping-screws $k$, passing right through same, as shown in Fig. 8, with winged nuts $l$ on said screws.

$m$ is a central aperture on which the mandrel can be mounted on a pin or spindle, so as to be free to revolve while in use.

$n$ is a removable segment attached to the board $i$, which latter by means of the slots $i'$ $i'$ therein can be readily removed from the screws $k$ $k$ when the pinching-nuts $l$ $l$ are slacked, and then when said segment $n$ and cross-bar $i$ have been removed thereupon the two segments $h$ can by means of the slots $h'$ therein be moved toward one another, the taper sides of the fourth segmental piece $o$ permitting this, as shown in Fig. 9, the lateral pins $o'$ keeping the segment $o$ in position.

The stretching of the self-shaped fabric $x$ in a circular direction is advantageously effected by lapping the fabric one or more times around a circular expansible apparatus or expanding-mandrel—such, for instance, as illustrated in Figs. 4 and 5 of the drawings hereunto annexed—and having secured the ends of the fabric we then expand the mandrel or apparatus by any suitable means, and thereby the fabric $x$ is stretched in a circular direction, and having thus stretched same we may now wet the fabric while thus stretched, the shrinkage consequent on the wetting being prevented owing to the fabric being already stretched tightly on the expanding-mandrel, or, if desired, before lapping the fabric on the expanding-mandrel, as described, it may advantageously be wetted and then put on the mandrel, such as shown in Figs. 4 and 5, the stretch being got out of the fabric very readily in this manner.

Instead of expanding the fabric, as above described, we may lap it on a suitable fixed mandrel of or about the diameter of the wheel for which it is designed and subject it to the treatment known as "mercerizing" or to a mercerizing liquid, or the fabric may first be stretched on the expanding-mandrel before mentioned and while so stretched subjected to the action of mercerizing liquids, as aforesaid.

In all cases and procedures it is the object more particularly to take the stretch out of the edges or near thereto or sufficiently take out the stretch to obtain a practically-inextensible fabric as a basis for the tire, and the sufficiency of the stretching can be easily ascertained by feeling or testing the edges of the fabric while on the aforesaid mandrel or may be ascertained in or by any other suitable manner or means.

The fabric is stretched or has the stretch taken out thereof to such a degree that when in use the pressure of the air-tube will be insufficient to blow off the cover, which by reason of its inherent cross-sectional curvature and its inextensibility is capable of withstanding the pressure of the air in the tube even under riding compression.

For instance, to make a cover for a twenty-eight-inch wheel we have found in practice that with a piece of fabric woven, as aforesaid, to make a cover such fabric will stretch until said cloth measures some twelve inches longer, as follows, viz: We lap such fabric on an expanding-mandrel twenty-six and one-half inches outside diameter and expand same, with the fabric lapped thereon, to twenty-nine and one-half inches outside diameter, and we then take off said fabric from the expanding-mandrel and wind same around a collapsible mandrel twenty-seven and three-fourths inches in diameter to allow one-eighth inch all around for rubber to thus make twenty-eight-inch outside diameter of said cover for a twenty-eight-inch tire, although we would here state that it is desirable in stretching the fabric for a cover the operation should be started at such a diameter as shall leave the fabric when fully stretched of the same radius as that of the making-up mandrel, (hereinafter referred to,) so as to obviate any puckering or slackness on the edge of the finished cover. Having thus stretched the fabric as and for the purposes stated, we then lap said fabric $x$ once, twice, or more (according to the character of the cover desired) around a collapsible mandrel, such as that shown in Figs. 6 to 9, and having now permanently secured the ends of said fabric in any suitable manner we proceed to rubber same or make up said fabric into the finished cover in any desired or suitable manner, advantageously in the following manner: The fabric $x$ is wound around the collapsible mandel and treated with rubber solution, which sticks the layers together and also gives a surface for the final separately manufactured and vulcanized circle of rubber to adhere to, and this molded strip or ring may have projections on it or be ribbed or corrugated or otherwise suitably formed to prevent side slip. The mounting of said fabric on said collapsible mandrel while same is rubbered or otherwise treated having the effect of preventing the rubbering causing any shrinkage or alteration in said fabric, and when the cover is finished (and dry or set) the mandrel is collapsed, (for instance, as described with reference to Figs. 6 to 9, or any other suitable apparatus may be used for this purpose,) and this enables the cover to be removed from said mandrel, and said cover is now ready for use.

The cover is made to fit closely within the groove or channel in any suitable concave rim and of a size which will just allow it to be put on (forced over) said rim, and an ordinary or any suitable air-tube is placed inside said cover and then inflated, and it will be found that owing to the character and structure of the cover manufactured as aforesaid same cannot be forced off the rim either by inflation or use when inflated.

We may, if desired, form a cover out of this stretched fabric without any rubbering, &c., or, if desired, we may form non-slipping covers of a single thickness of thin canvas, formed and stretched according to our present invention, to fit over our aforesaid covers or any other pneumatic tire (tube-tire, tubeless tire, or tire with inner air-tube and detachable outer cover) to which same may be applicable simply for use as a non-slipping surface.

What we claim is—

1. A tire-cover for pneumatic tires, composed of an endless band of fabric woven with a cross-sectional curvature approximately that of the finished tire, and being open along its interior circumference, said band being permanently deprived of its extensibility and rubbered, substantially as described.

2. A tire-cover for pneumatic tires, composed of an endless band of fabric woven with a cross-sectional curvature approximately that of the finished tire, and being open along the whole of its interior circumference, the edges of said band being permanently deprived of their extensibility by being stretched so as to resist the pressure of the inner tube and to cling to the rim by reason of their inherent rigidity, the said band being rubbered, substantially as described.

3. A curved woven fabric, woven to the radius and cross-section of the tire and rendered so far inextensible by stretching in a circular direction that the same when rubbered and made up will form a cover which will fix itself securely on the rim on inflation.

4. A detachable cover for pneumatic tires formed from a curved woven fabric, woven to the radius of the tire from which fabric the longitudinal elasticity has been permanently removed by stretching in a circular direction so as to render said fabric so far inextensible that the same when rubbered and made up will form a cover which under inflation will hold itself securely on the rim.

5. A detachable cover for pneumatic tires made from a curved woven fabric from which the longitudinal elasticity has been removed by stretching in such wise and to such an extent that such cover will under inflation fix and hold itself upon the rim of the wheel without the addition of any holding-on devices.

THOMAS CALDWELL.
WILLIAM CALDWELL.

Witnesses:
E. JAMES HALL,
JOHN W. THOMAS.